Dec. 26, 1950 W. MILLER ET AL 2,535,445
GOOSE DECOY
Filed Feb. 19, 1947 2 Sheets-Sheet 1
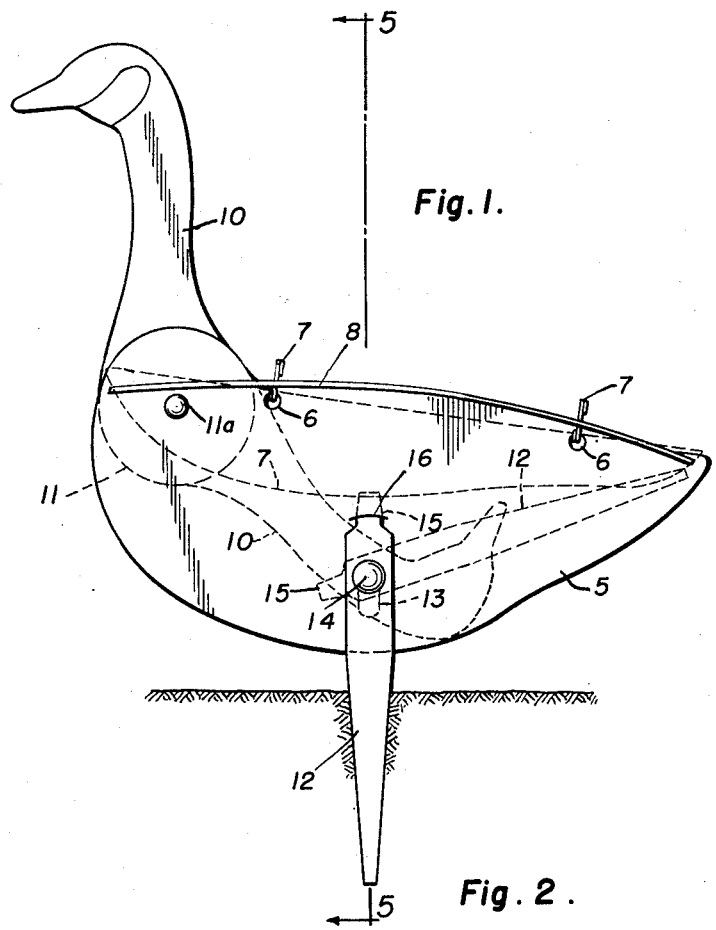
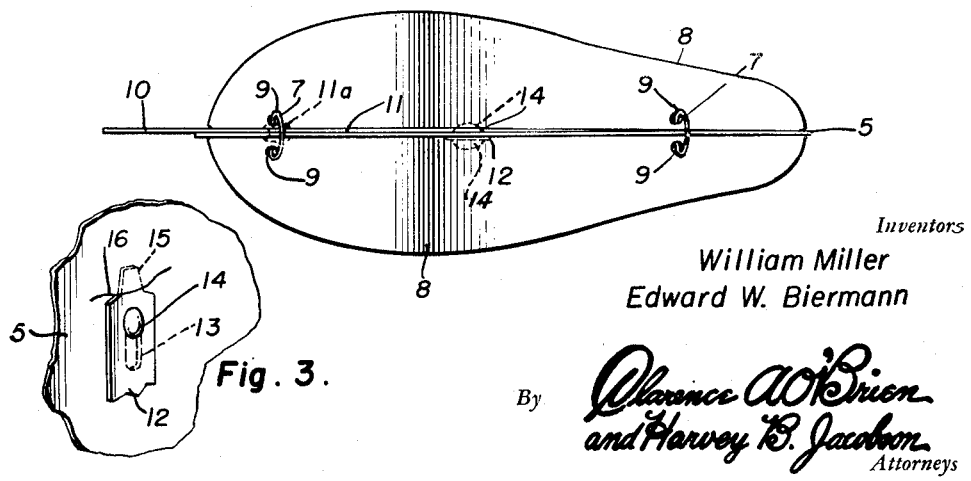
Inventors
William Miller
Edward W. Biermann Dec. 26, 1950     W. MILLER ET AL     2,535,445
GOOSE DECOY
Filed Feb. 19, 1947     2 Sheets-Sheet 2
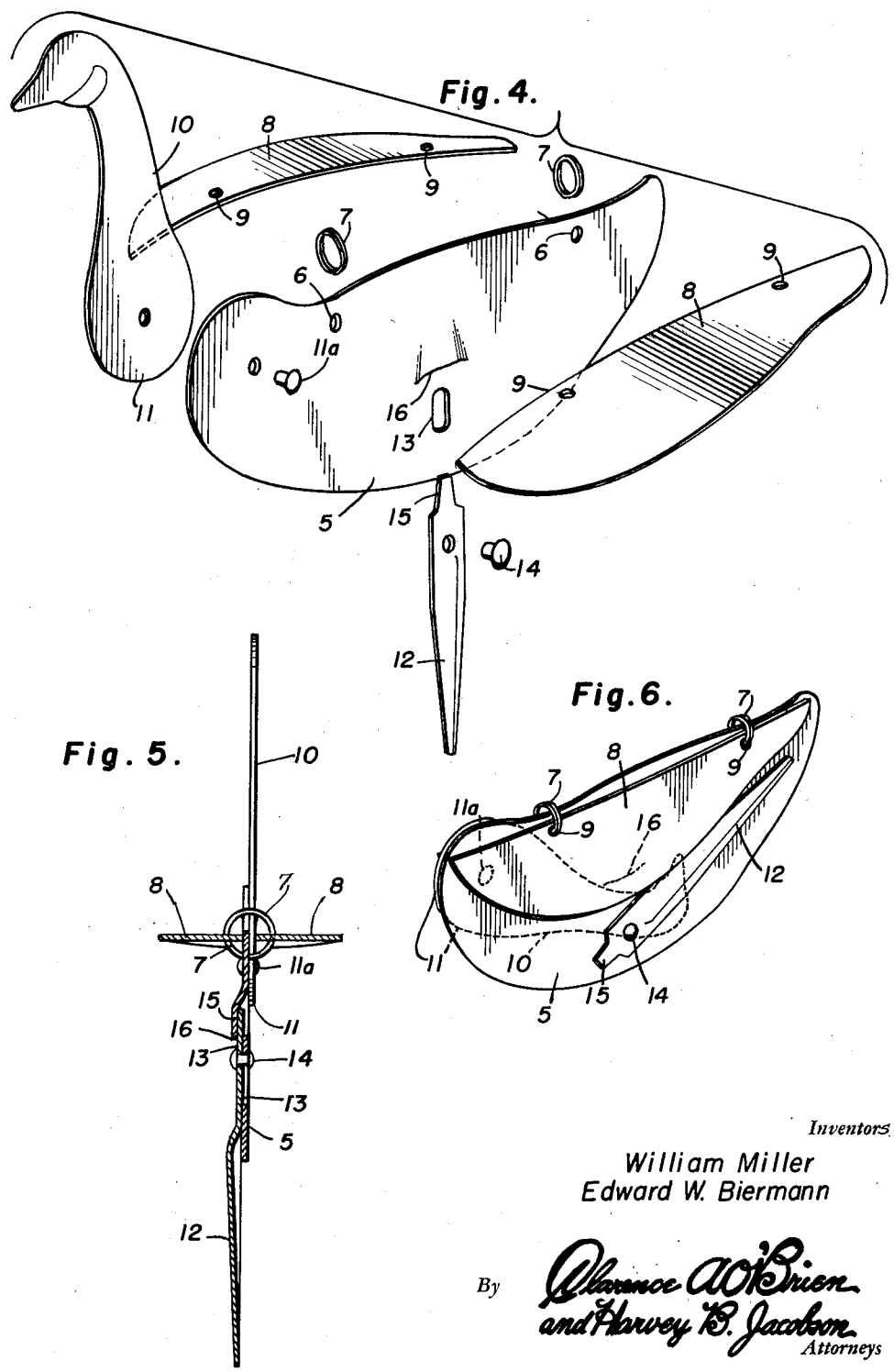
Inventors
William Miller
Edward W. Biermann Patented Dec. 26, 1950

2,535,445

UNITED STATES PATENT OFFICE 2,535,445

GOOSE DECOY

William Miller and Edward W. Biermann, Ritzville, Wash.

Application February 19, 1947, Serial No. 729,450

2 Claims. (Cl. 43—3)

The present invention relates to an improved wild game decoy which is expressly, but not necessarily, adapted to attract wild geese in a manner to bring same within gun shot range of huntsmen, sportsmen and the like.

As the opening statement of the invention implies, known types of decoys are of various forms and construction. It follows that the principal object of the present invention is to provide a unique decoy which is possessed of novel structural, functional and other features not found in prior art types known to us.

In carrying out the principles of the instant invention a decoy is provided which is simple, practical, compact and convenient to handle, and otherwise aptly equipped to attain the desired ends in a satisfactory manner, commercially, in use, and otherwise.

Another object of the invention is to provide a decoy which is novel in that it embodies foldable wings, a foldable head and neck, and a foldable ground penetrating and anchoring stake, all of such parts being collapsible to positions within the marginal confines of the main body.

More specifically, novelty is predicated upon a foldable type decoy in which the foldable wings are constructed and fashioned from malleable aluminum whereby said wings lend themselves adaptable to proper shaping and assembling to obtain best results.

Another object of the invention is to provide a slotted supporting stake which is fastened by a simple rivet to the body at a centralized balancing point, this slotted end of the stake being provided with a detent and said detent being releasably connectible with a keeper slot in said body, whereby to securely maintain the stake in a position to sustain the decoy at a point in wheat and grain fields or elsewhere, natural feeding places for wild geese.

Other objects, features and advantages will become more readily apparent from the following description and the accompanying illustrative drawing.

In the sheet of drawings, wherein like numerals are employed to designate like parts throughout the views:

Figure 1 is a side elevational view of the decoy, as constructed in accordance with our invention, showing the same set up for use;

Figure 2 is a top plan view of Figure 1;

Figure 3 is a fragmentary perspective view detailing the manner in which the stake is retained in a set decoy supporting position;

Figure 4 is an "exploded" perspective view comprehending all of the structural details;

Figure 5 is a front edge view of Figures 1 and 2; and,

Figure 6 is a view of the device as it appears when folded.

Referring now to the drawings by distinguishing reference numerals, the main or body plate is denoted by the numeral 5. This is of appropriate size and is marginally patterned and shaped to represent the profile of a goose, or if desired, an equivalent bird. The upper edge portion of said plate is provided with apertures 6 to accommodate so-called split rings 7, which rings serve to hingedly attach the two wings 8 to the upper edge portion of said body. As shown in Figure 2 the inner longitudinal edge portions of the wings which are straight from end to end, are provided with apertures 9 to accommodate the split wire assembling and hinging rings 7. The apertures 6 and rings 7 are of sufficient diameter to permit ready folding of the wings. The wings are preferably made of malleable aluminum and generally they are bowed with the fingers to assume the longitudinal curvatures best shown in Figure 1. Thus bowed, the forward and rear end portions of the respective wings rest against adjacent surfaces on the intervening body, serve as stays and thus serve to prop the wings to assume the spread positions shown in Figs. 1, 2 and 5. As previously mentioned it is within the purview of the invention to merely bend either the forward or rearward ends laterally downwardly. That is to say, the user may choose to leave the major central and forward portions of the wings flat and deflect or laterally bend the rear ends and the latter will then function as props for supporting the wings in the desired spread positions. When the wings are collapsed and folded down as shown for example in dotted lines in Fig. 1 and in full lines in Fig. 6, they are pressed by hand and completely flattened and thus straightened out and lie in intimate contact with opposite sides of the body for compactness and convenience in carrying and transporting.

The neck and head, a separate unit, is denoted by the numeral 10 and this part is suitably shaped as illustrated in the drawing. It is also struck out from aluminum flat stock. The lower portion of the part 10 is of general disc-like form as at 11 and this is centrally riveted, at 11a, to the frontal and upper portion of the body 5. The rivet connection is such as to provide a friction retaining result. That is to say, the parts 10 and 5 are sufficiently tight in relation to each other as to produce a degree of friction which serves to maintain the neck extended or folded down and out of the way as shown in dotted lines in Figure 1. The unit 10 is on one side of the body and projects through the space provided between the body and inner longitudinal edges of the wings, as is obvious, particularly from Figure 2.

The supporting leg or stake, is denoted by the numeral 12 and this is of appropriate length. The inner end of the stake is slotted as at 13 and the slotted portion is fastened to the body by way of a suitable headed rivet 14. The upper or inner end of the stake is reduced in width to provide a detent 15 and this detent is releasably connectible with a keeper slot 16 formed in the body at the point indicated. Here again the stake and body are riveted together with sufficient tightness so that the stake, when folded as shown in dotted lines in Figure 1 is self-retained in its folded position. The rivet and slot connection provides sufficient freedom of movement of the stake in relation to the body to allow the detent to be readily slipped into the keeper slot or removed therefrom in an obvious manner.

The overall construction of the decoy is such as to represent the utmost in simplicity from a structural and functional point of view. It is believed, therefore, that a detailed description of the steps of folding and setting up is perhaps unnecessary.

By way of summation, we would like to remind the reader that the upper forward edge portion of the body is rounded to correspond to the pivoted rounded portion 11 of the head and neck unit and that the friction contact between the body and the neck unit is sufficient to hold said neck unit either projected or retracted as shown respectively in full and dotted lines in Figure 1. It is also to be noted that the neck unit is on one side of the body and a slidable pivoted stake 12 is on the opposite side of the body. Therefore, these parts do not interfere with one another when they are collapsed to folded positions. Further, it is to be noted that there is ample space between the forward edge portion of the wing and neck unit to allow the latter to fold freely without coming into contact with the wing. That is to say, the disk-like portion 11 is sufficiently thin that when the wings are open, it is interposed between the edge of the wing and the body, allowing the head and neck unit to swing and fold "in" and "out" in the clearance space existing between said wing and body. Further, reverting to the ductile nature of the sheet aluminum wings, we desire to add that while, ordinarily speaking, the intermediate or central portions of the wings are longitudinally bowed in order to cant the forward and rear end portions of said wings so that they will serve as stays, it is obvious that it is not absolutely esesntial to bow the central portion of the wing since either end alone, or both forward and rearward ends together, could be selectively bent down with the fingers and then angled to cause it to cock itself against the body at an angle sufficient to prop the wing up and to take the desired spread or open position.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What we claim is:

1. A foldable sheet material decoy of the class shown and described comprising a relatively flat body of sheet material of requisite shape and form, a pair of projectible and retractible wings hingedly connected to the upper edge portion of said body, said wings being metal and being longitudinally bowed whereby the forward and rearward ends rest against the body and serve as supports and whereby the wings remain in outspread positions.

2. A decoy of a collapsible type comprising a relatively flat body of sheet material of requisite shape and form and provided with head means and stake means, a pair of flat semi-elliptical wings having apertured straight edged portions disposed in parallelism along opposite sides of said body, the upper edges of said body having apertures registrable with the apertures in said wings, and rings anchored in the apertures in body and wings respectively and loosely hinging the wings on said body, said wings having malleable tip portions which have an angular bend, canted and set, by hand, to provide stay members, said wings being capable of being subsequently restored to original flat form so that the wings may be folded compactly against the body when not in use.

WILLIAM MILLER.
EDWARD W. BIERMANN.

REFERENCES CITED

The following references are of record in the file of this patent:

UNITED STATES PATENTS

| Number | Name | Date |
|---|---|---|
| 156,239 | Strater et al. | Oct. 27, 1874 |
| 274,124 | Keller | Mar. 20, 1883 |
| 529,463 | Roberts | Nov. 20, 1894 |
| 575,283 | Frantz | Jan. 12, 1897 |
| 977,787 | Davis | Dec. 6, 1910 |
| 1,083,882 | Hindmarsh | Jan. 6, 1914 |
| 1,473,612 | Dewey | Nov. 13, 1923 |